June 2, 1931.  A. E. DE KONING  1,808,453
COMBINATION SAWING MACHINE
Filed June 10, 1929
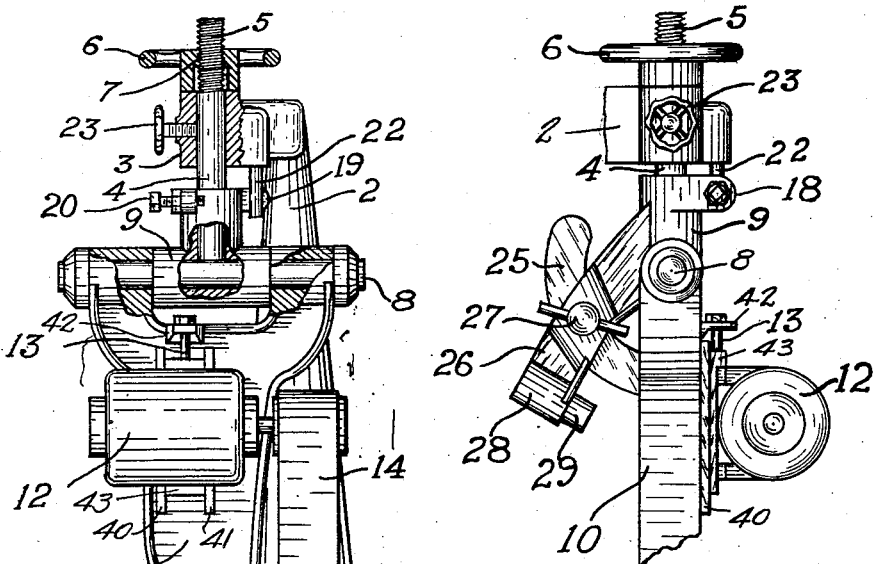
Fig. 1
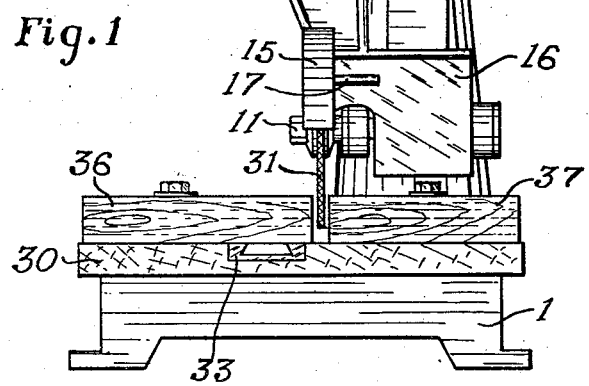
Fig. 2
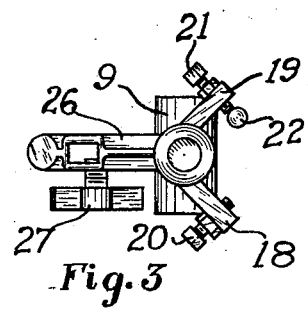
Fig. 3
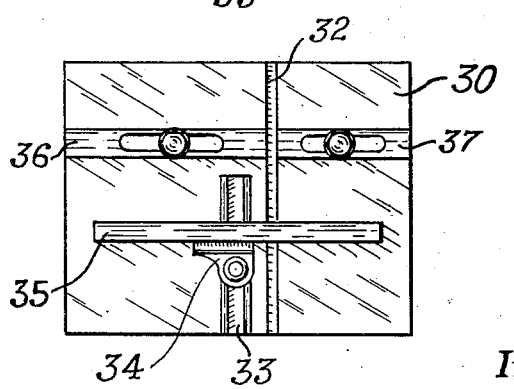
Fig. 4
Fig. 5
Inventor
Arthur E. De Koning Patented June 2, 1931

1,808,453

UNITED STATES PATENT OFFICE

ARTHUR E. DE KONING, OF PORTLAND, OREGON

COMBINATION SAWING MACHINE

Application filed June 10, 1929. Serial No. 369,737.

My invention relates to improvements in combination sawing machines in which the saw moves through the work in the cutting-off operation, and in which the work is fed to the saw in the ripping operation, wherein certain identical members serve different purposes in the respective uses to the end that unique economies of weight and manufacturing costs are afforded.

The object of my invention is to provide in a self contained combination machine certain advantages of construction and operation peculiar to the swinging cut-off saw, the special utility of a mitre saw in which a vertically adjustable saw is journaled above and moves through the work, and of a vertically adjustable rip saw journaled above the work.

Other objects and advantages of my invention are apparent in the following discourse wherein the significance of the reference numerals in the accompanying drawings, details of construction and operation of a typical device embodying the invention, and its particular advantages and utility are explained.

Figure 1 represents a front view of the complete machine partly in vertical section.

Figure 2 represents a side view of a fragment of the machine in elevation.

Figure 3 represents a top view of a member shown in its other two aspects than in Figures 1 and 2.

Figure 4 represents a top view of the table of the machine with both cutting-off and ripping gages secured.

Figure 5 represents a side view in elevation of the frame of the machine.

The reference numeral 1 indicates the base of the machine to which the column 2 is attached. At the extremity of this column 2 at a point 3 a vertical shaft 4 is journaled. The upper end of this vertical shaft 4 is provided with a thread 5 engaging a female counterpart in the hand wheel 6 at 7. To the lower end of the shaft 4 a horizontal shaft 8 is rigidly secured by the piece 9.

This horizontal shaft 8 supports the saw carriage 10 journaled thereon. At the lower extremity of the saw carriage 10, the saw arbor is journaled in the usual manner of swing saws. A motor 12, secured to a sliding frame 43, is adjustable vertically to tighten the belt 14 by means of a screw 13 rotatably mounted in a projection 42 formed on the carriage 10 and engaging the sliding frame 43; the said sliding frame being in turn fitted to the slideways 40 and 41 also formed on the carriage 10. A belt 14 serves to drive the arbor 11 from the motor 12. The customary saw and belt guards 15 and 16 respectively, and a handle 17 are secured to the saw carriage 10.

The piece 9 is formed with several special parts as follows: Two wings 18 and 19 into which the adjustable contact points 20 and 21 respectively are screwed, serve to limit the rotation of the piece about its vertical axis provided by the shaft 4, so that the saw carriage and hence the saw blade may be conveniently moved through ninety degrees for cutting off or ripping; a stop 22 rigidly secured in the column 2 engaging the said contact points 20 and 21.

A clamping screw 23 engaging a thread in the column 2 affords a means for securing the shaft 4 and depending members against rotation about the vertical axis, and the hand wheel 6 affords a means for raising and lowering the shaft 4 with its depending members.

In the lateral aspect of the machine as represented in Figure 2, and affecting the mobility of the carriage 10 about its horizontal pivotal axis provided by the shaft 8, several other parts cooperate as follows: A circular piece 25 attached to the back of the carriage 10 passes through a clamping piece 26 formed upon the piece 9 and provided with a clamping screw 27. The piece 26 is further formed with a chamber 28 in which is set a rubber buffer 29 to engage the carriage 10 at the limit of its backward stroke when the machine is used for cutting off.

The saw carriage 10 is thus mounted upon a universal joint comprising two perpendicularly disposed axes, and means are provided to restrict the motion of the carriage about either or both of these axes, as well, the universal joint itself being capable of a vertical adjustment. These features are of especial utility in connection with a table 30 secured to the base of the machine 1 to which all of the above adjustments and motions are related.

A cut made in the table 30 by the saw 31 is represented at 32 in Figure 4. A dove-tailed slot 33 and customary clamping device 34 afford a means for securing the ripping gage 35 in a selected position upon the table, or for removing it entirely therefrom. A straight-edge guide composed of the two pieces 36 and 37 for use in cutting off is likewise removable; in Figure 1 this guide is shown as secured in place for cutting off work, whilst the ripping gage 35 is removed.

The following description of the operation of the machine comprises only that peculiar to this machine as distinguished from ordinary machines since the manner of driving the saw blade is well understood.

For cutting off work the machine is set up as illustrated in Figure 1, namely, the screw 23 is made to clamp the shaft 4 in a particular position determined by the hand-wheel 6 and contact screw 21 engaging the stop 22; the screw 27 (Figure 2) being disengaged from the circular piece 25. Stock is placed against the guide 36—37 and the cut made in the manner common to swinging cut-off saws.

For mitering, the screw 23 is loosened and the horizontal axis of oscillation of the saw carriage 10 provided by the shaft 8 is rotated upon the vertical axis provided by the shaft 4 to the desired angle where the shaft 4 is again secured against rotation by setting up the screw 23.

A particular characteristic of my invention is the provision for the alignment in the same plane with the vertical axis provided for by the shaft 4 of the saw blade to provide for the location of the path of the saw in its oscillatory motion where it emerges from the straight-edge 36—37 at the same position regardless of the angular adjustment of the saw carriage about that axis. This contemplates the alignment of the straight-edge 36—37 also with particular reference to the vertical axis. Thus, two planes whose line of intersection coincides with this vertical axis contain respectively, the saw blade on the one hand and the straight-edge 36—37 on the other hand.

For ripping with the saw rigid, the carriage is rotated upon its vertical axis and secured in the manner above described, in a position whereat the saw will be parallel to the ripping gage 35 which is now substituted upon the table for the cut-off guide 36—37. Next, the carriage is pushed back slightly toward the buffer 29 so that the leading edge of the saw shall be just behind the vertical axis of rotation of the carriage, and the clamping screw 27 set up to lock the carriage upon its horizontal axis.

The screw 23 is now again loosened and the hand-wheel 6 manipulated to procure the desired position of the saw with reference to the table 30, and finally set up again to secure the carriage both as to vertical adjustment and that in rotation as before.

Now it will be apparent that the vertical adjustment provided by the hand wheel 6 and threaded portion 5 of the shaft 4 is especially useful in grooving work when dado heads are substituted for the saw blade, since the depth of the cut may be varied to suit the purpose in hand. And this feature is equally valuable in working wood across the grain, mitering, or ripping with the grain.

The center of gravity of the carriage and motor assembly is disposed forward of a line joining the arbor with the horizontal shaft so as to provide for the return of the saw to its rear-most position when used in cutting off work, or to hold the leading edge of the saw approximately in line with the vertical axis (provided by the shaft 4) when the machine is being made ready for ripping.

It being a matter of very great importance to insure the parallelism of the saw blade with the ripping gage to keep the saw from leading in a ripping cut, special provision is made in my invention to correct slight misalignments of the saw blade caused by the straining of the supporting members of the arbor, or by improper feeding of the stock to the saw, accruing out of the disposition of the parts resisting such strains as related to the force causing such misalignment.

It will be evident that although a fair provision for the alignment of the saw is afforded by the normal rigidity of the parts suffering such stresses, the elasticity of the materials employed will allow of some troublesome variations of the saw blade from exact truth of alignment; each member being distorted in a degree affected by the lengths of the levers involved and the dimensions of parts so stressed. In consequence of this, the shaft 4, being the member of slightest dimension, and subjected to relatively great leverages, will contain the center of such distortions whilst the saw blade will have the greatest amplitude of movement in the distortion. Hence, in a manner analagous to the action of a trailing castor, the saw blade will tend always to swing back to truth of alignment,—constituting a function of even greater value than that possible to incorporate by extreme rigidity.

Having described my invention what I claim is:

1. A combination sawing machine comprising, a standard secured to a base fitted with a table, a saw carriage attached to said standard by a universal joint comprising two perpendicularly disposed axes, one of which is vertical and supports the other with its depending members, and means for securing said carriage against oscillation about either or both of said axes wherein the said vertical axis of said universal joint is disposed in the plane containing the saw blade, and is adjustable vertically through its journal in said standard.

2. A combination sawing machine comprising a standard secured to a base fitted with a table, a saw carriage attached to said standard by a universal joint comprising two perpendicularly disposed axes a vertical one of which supporting the other with its depending saw carriage is vertically adjustable through said standard, and means for securing said carriage against oscillation about either or both of said axes comprising a single means for securing the said vertical axis against rotation or axial movement through its journal in said standard wherein the said vertical axis of said universal joint is disposed in the plane containing the saw blade.

3. A combination sawing machine comprising, a standard secured to a base fitted with a table, a saw carriage attached to said standard by a universal joint comprising two perpendicularly disposed shafts and cooperating journals, one of which shafts, vertically disposed in the plane of the saw blade and carrying the other shaft and depending saw carriage, is adjustable axially through its journal formed in said standard by means of a hand wheel engaging a thread thereon and bearing upon said standard, and means for securing said carriage against oscillation about either or both axes of said universal joint.

4. A combination sawing machine comprising, a standard secured to a base fitted with a table, a saw carriage attached to said standard by a universal joint comprising two perpendicularly disposed shafts and cooperating journals one of which shafts is vertical and adjustable axially through its journal formed in said standard by means of a hand-wheel engaging a thread thereon and bearing upon said standard, a pair of contacts rigidly attached to said vertical shaft adapted to engage a stop secured to said standard to limit the rotation of said saw carriage about its vertical axis to approximately ninety degrees wherein the vertical axis of said universal joint is disposed in the same plane as the saw blade.

5. A combination sawing machine comprising, a standard secured to a base fitted with a table, a saw carriage depending from said standard upon a universal joint comprising two perpendicularly disposed axes, the vertical one of which is axially adjustable through said standard, means for raising and lowering said universal joint and saw carriage, and a straight-edge adapted to be attached to said table wherein the line of intersection of two planes containing respectively the said straight-edge and saw blade coincides with the vertical one of the said two axes.

6. A combination sawing machine comprising, a standard secured to a base fitted with a table, a saw carriage depending from said standard upon a universal joint comprising two perpendicularly disposed shafts and cooperating journals one of which said shafts is vertical and adjustable axially through its journal formed in said standard by means of a hand wheel engaging a thread thereon and bearing upon said standard, a pair of contacts rigidly attached to said vertical shaft adapted to engage a stop secured to said standard to limit the rotation of said saw carriage about its vertical axis to approximately ninety degrees, a straight-edge attachable to said table through which the saw moves in cut-off work, a ripping gage attachable to said table parallel with but separated from the position of said straight-edge, and wherein the said vertical shaft contains the line of intersection of two planes in which lie the said straight-edge and the saw blade respectively.

7. A combination sawing machine comprising, a standard secured to a base fitted with a table, a saw carriage depending from said standard upon a universal joint comprising two perpendicularly disposed shafts and cooperating journals one of which said shafts is vertical and adjustable axially through its journal formed in said standard by means of a hand wheel engaging a thread thereon and bearing upon said standard, a driving motor mounted upon the forwardmost face of said saw carriage to cause the said saw carriage when at rest to be disposed by force of gravity at its rearmost position, means for adjusting said motor upon said saw carriage to tighten the driving belt, a pair of contacts rigidly attached to said vertical shaft adapted to engage a stop secured to said standard to limit the rotation of said saw carriage about its vertical axis to approximately ninety degrees, a straight-edge attachable to said table through which the saw moves in cut-off work, a ripping gage attachable to said table parallel with but separated from the position of said straight-edge, and wherein the said vertical shaft contains the line of intersection of two planes in which lie the said straight-edge and the saw blade respectively.

ARTHUR E. DE KONING.